United States Patent [19]

Dammar

[11] 4,262,853
[45] Apr. 21, 1981

[54] APPARATUS FOR WINDING ARMATURES

[75] Inventor: Raymon H. Dammar, Minneapolis, Minn.

[73] Assignee: Possis Corporation, Minneapolis, Minn.

[21] Appl. No.: 938,504

[22] Filed: Aug. 31, 1978

Related U.S. Application Data

[60] Division of Ser. No. 795,374, May 7, 1977, Pat. No. 4,174,815, which is a continuation of Ser. No. 557,363, Mar. 11, 1975, abandoned.

[51] Int. Cl.³ .................. H02K 15/04; H01F 41/04; B65H 81/00
[52] U.S. Cl. .................. 242/7.05 B; 29/732; 29/735; 242/7.14
[58] Field of Search .................. 242/7.05 B, 7.05 R, 242/7.03, 7.14; 29/732, 735

[56] References Cited

U.S. PATENT DOCUMENTS

| | | | |
|---|---|---|---|
| 2,942,793 | 6/1960 | Moore | 242/7.05 B |
| 3,098,616 | 7/1963 | Eminger | 242/7.05 B |
| 3,382,729 | 5/1968 | Steinke | 242/7.05 B |

Primary Examiner—Billy S. Taylor
Attorney, Agent, or Firm—Burd, Bartz & Gutenkauf

[57] ABSTRACT

A machine and method for winding coils of wire on a slotted core of an armature assembly. The machine has a holder for releasably supporting the armature core assembly in an upright position. Rotatable annular members located adjacent opposite sides of the core have holes for accommodating wires that are wound on the core. Chucks mounted on the annular members guide the wires moving from the annular members into two pairs of slots in the core. A motor connected to the annular members with a common drive structure rotates the annular members in opposite directions to wind two coils of wire on the core. A core indexing motor drivably connected to the holder operates to sequentially index the core during the winding operation.

2 Claims, 18 Drawing Figures

APPARATUS FOR WINDING ARMATURES

This Application is a Division of Application Ser. No. 795,374, filed May 7, 1977, now U.S. Pat. No. 4,174,815, granted Nov. 20, 1979. Application Ser. No. 795,374 is a Continuation of Application Ser. No. 557,363, filed Mar. 11, 1975, now abandoned.

BACKGROUND OF INVENTION

Armature core winding machines have a pair of complementary wire guiding shrouds between which the core of the unwound armature core assembly is gripped. The shrouds guide the wire into the slots during the winding operation. Heretofore, the wire drawn from a source thereof was wound into the core slots with moving arms known as flyers that rotated about an axis perpendicularly intersecting the axis of the core. Usually there were two flyers, one at each side of the core, with the orbits of the flyers so oriented that the stretches of wire leading from the flyers to the armature core slid along the surfaces of the shrouds and into a pair of slots in position to receive wire. The flyers are mounted on opposing shafts that are driven in opposite directions during the winding operation. The drive shafts and structures used to rotate the shafts limit access to the winding areas to assist hooking the lead wires onto commutator hooks, guide wires into armature slots and like operations. In these prior winding machines, the intersecting axes of the core and flyers were horizontal so that during the winding operation, the armature core assemblies were held with their axes horizontal. Examples of this type of winding machine are shown in U.S. Pat. No. 3,474,515 and No. 3,818,570.

While the aforesaid conventional armature winding machines were a boon to the electric motor industry, they have not been able to meet the ever increasing demands for higher production speeds. To a large degree, that was due to the inevitable complexity of the mechanism required to drive the flyers of conventional armature winding machines. Bearing in mind that the flyers rotated in circular orbits that encompassed the wire guiding shrouds, they were mounted on the adjacent ends of coaxial but spaced apart relatively heavy shafts and, as a result, the rotating flyer assemblies had considerable inertia. This limited the rapidity with which the flyers could be started and stopped and thus made it impossible to significantly increase production speeds, since to gain the desired speed, the mechanism by which the flyers were driven would have to have been capable of instantaneous starts and stops and immediate acceleration to a very high running speed.

But the size and weight of the shafts that carried the flyers was not the only speed limiting factor. The pulleys, belts and gear box needed to bring driving torque, in opposite directions, to the flyer shafts also contributed significantly to the reasons why the production speeds of conventional armature winding machines were limited. In addition to the speed limiting characteristics of the flyer assemblies of prior winding machines, and their driving mechanism, these parts of the machine were also rather costly to produce.

SUMMARY OF INVENTION

This invention relates to automatic winding machines and refers more particularly to an armature winding machine by which coils of wire are successively wound into one or more pairs of circumferentially spaced slots in the iron core of the armature, and the starting and ending leads of the successively wound coils are mechanically and electrically connected to their respective segments of the commutator of the armature.

In one form of the invention, the machine has a housing means rotatably carrying a first annular means and a second annular means. The annular means are located adjacent opposite portions of the armature core assembly and have means for carrying wire around the core. Drive means operates to rotate the first annular means and second annular means whereby wire is wound in pairs of slots in the core. Chucks having wire guiding surfaces mounted on the annular means operate to guide the wires into the pairs of slots. Tabs movably mounted on the chucks guide the wire over the end of the core and into the slots.

In another form of the invention, a single rotatable annular means is located adjacent one side of the armature core assembly. A drive means rotates the annular means to wind wire into a pair of slots in the core. A chuck mounted on the annular member has a surface to guide the wire into the slots. Tabs movably mounted on the chucks guide the wire over the end of the core and into the slots.

With a view to increasing the production speeds of armature winding machines and effecting a cost reduction, the present invention has eliminated the conventional flyers with their necessarily heavy and expensive drive shafts, their wire guiding pulleys and the complex transmission mechanism through which driving torque was delivered to the flyers, and has replaced all that structure and mechanism with a novel, greatly simplified, relatively light and very well balanced mechanism capable of winding coils onto the slotted cores of armature core assemblies at speeds theretofore deemed unattainable.

Contributing to the attainment of the increased production speeds achieved by this invention is an improved way of indexing the armature core assemblies to successively bring different pairs of core slots into winding receiving positions, and also bring the wire receiving portions of the commutator segments into position to have the wire leads to and from the successive coils attached thereto. Heretofore, the indexing of the armature core assemblies was done by mechanically actuating a pawl that engaged an edge of a core slot and, upon being actuated by an air cylinder, rotated the assembly through an angle that indexed the assembly to its desired next location, though not necessarily with the desired degree of accuracy.

In the winding machine of this invention, indexing of the armature core assembly is accomplished in a much more sophisticated way by directly coupling the shaft of the assembly to an electric motor of the type that is capable of rapidly and very accurately producing minutely small increments of rotation as well as rotation through any desired angle, and controlling that motor by a computer-type instrumentality to which data derived from sensing the angular locations of the core slots and the slots in the commutator segments is fed.

Where, as indicated hereinbefore, in prior winding machines the armature core assembly was held with its axis horizontal during the winding operation, with this invention it is vertically oriented, with the commutator end of the assembly lowermost. As a result, the falling small pieces of wire that are trimmed from the wire leads at their points of attachment to the commutator drop harmlessly from the zone of action and do not foul up subsequent operations.

An object of the invention is to provide an armature coil winding machine with winding structure that is fast and efficient in operation and permits access to the core, commutator, winding operation areas, hooking operation areas, and areas for manipulation of lead wires during the winding operation. Another object of the invention is to provide an armature coil winding machine with annular winding structure that has small inertia whereby the machine can be quickly stopped and started. A further object of the invention is to provide a pair of wire winding members with a common belt drive that rotates the members in opposite directions. Still another object of the invention is to provide a compact wire winding machine which has a minimum of parts and does not have winding shafts. Yet another object of the invention is to provide an armature winding machine that is adaptable to automatic overhead loading and unloading of the armature core assemblies.

DESCRIPTION OF PREFERRED EMBODIMENTS

Figure 1:
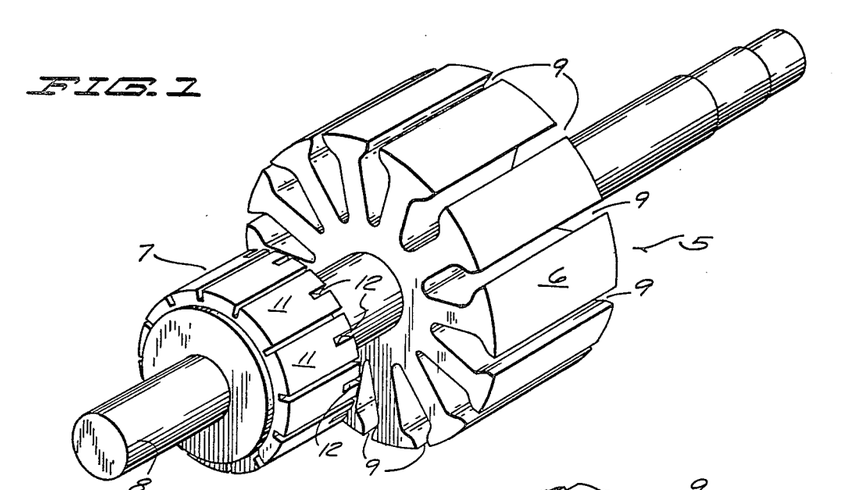
FIG. 1 is a perspective view of an unwound armature core assembly, the winding of which is especially well performed by the machine of this invention.
Figure 2:
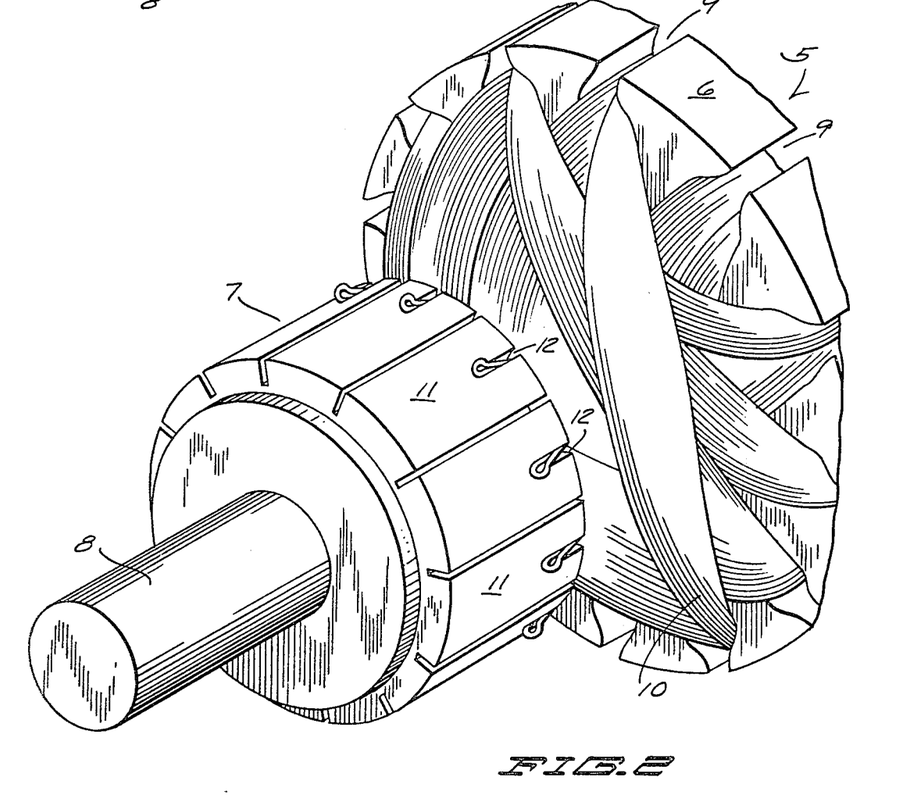
FIG. 2 is a perspective view of the commutator end portion of the wound armature, showing the leads of the successively wound coils attached to the commutator bars by the so-called com-stuffing procedure.

Referring to the drawings, and considering first FIGS. 1 and 2 thereof, the numeral 5 designates generally an armature core assembly that is representative of the type onto which coils are wound by the winding machine of this invention. As is customary, the assembly consists of a core 6 formed of a stack of steel laminations and a commutator 7, both mounted in axially spaced relation on a common shaft 8. The core has the usual circumferentially spaced longitudinally extending slots 9 into which the windings 10 of the armature are wound, part of which are shown in FIG. 2.

The commutator, as is well known, consists of a circle of circumferentially spaced copper bars or segments 11, mounted in a spool of suitable insulating material, and in the present case each bar or segment has a slot 12 cut into its end portion nearest the core. The bottom of this slot slopes downwardly towards its open end which faces the core 6.

The winding machine 4, which is the concern of this invention, differs significantly from the machines heretofore available for the winding of armatures. Even the appearance of the machine is different, as will be immediately apparent from FIG. 3. Because of the improvement over prior winding machines in the manner in which the winding mechanism functions in this invention, all of the operating parts of the machine 4 are housed within a neatly trim cabinet 13, which simply has an opening 14 in its top wall through which the unwound armature core assemblies 5 are introduced into the machine 4 and the wound armatures are removed from the machine 4, either by hand or by automatic loading mechanism (not shown).

Figure 4:
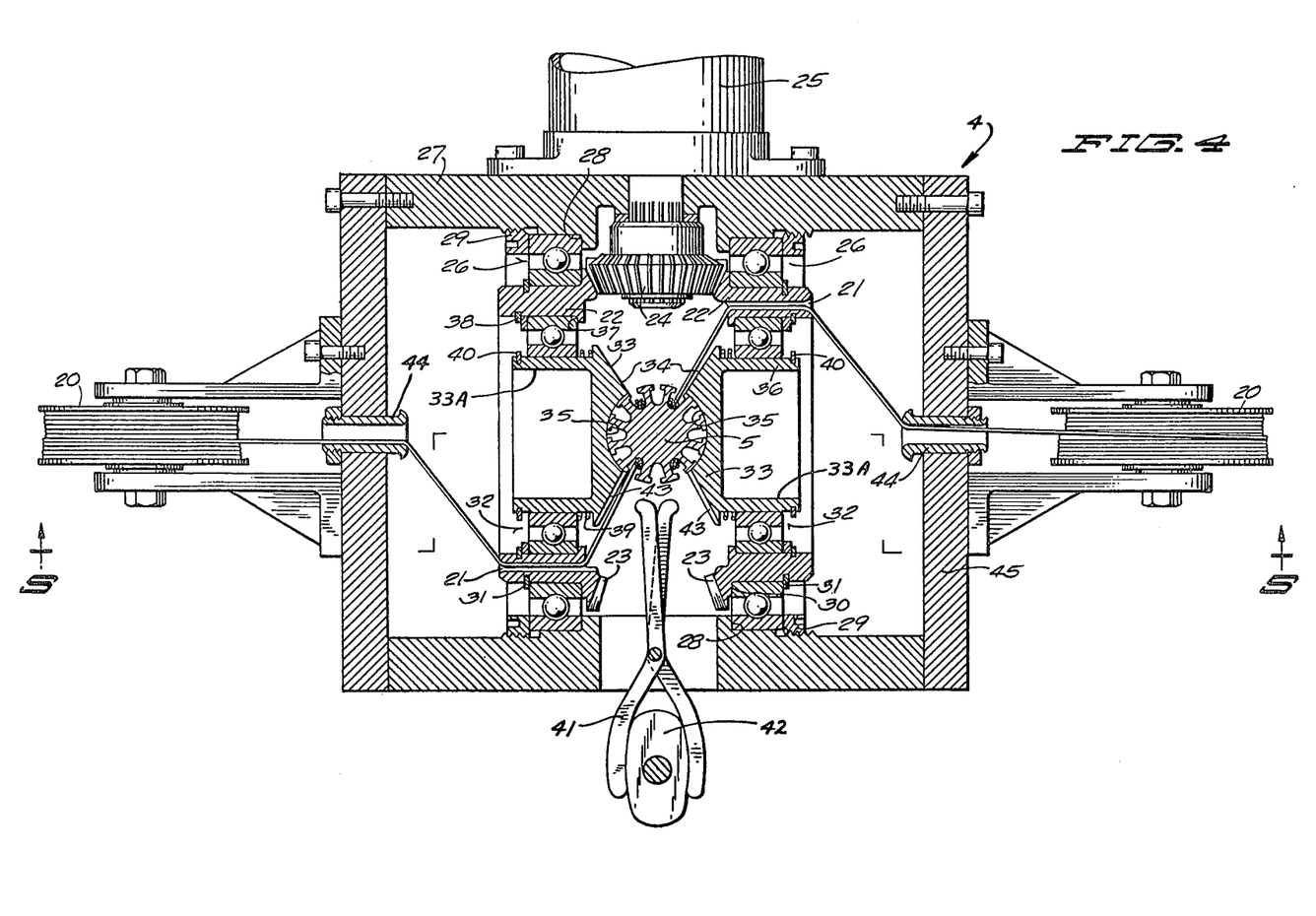
FIG. 4 is a horizontal sectional view through one embodiment of the coil winding mechanism of the machine, with an armature core assembly in position therein.
Figure 5:
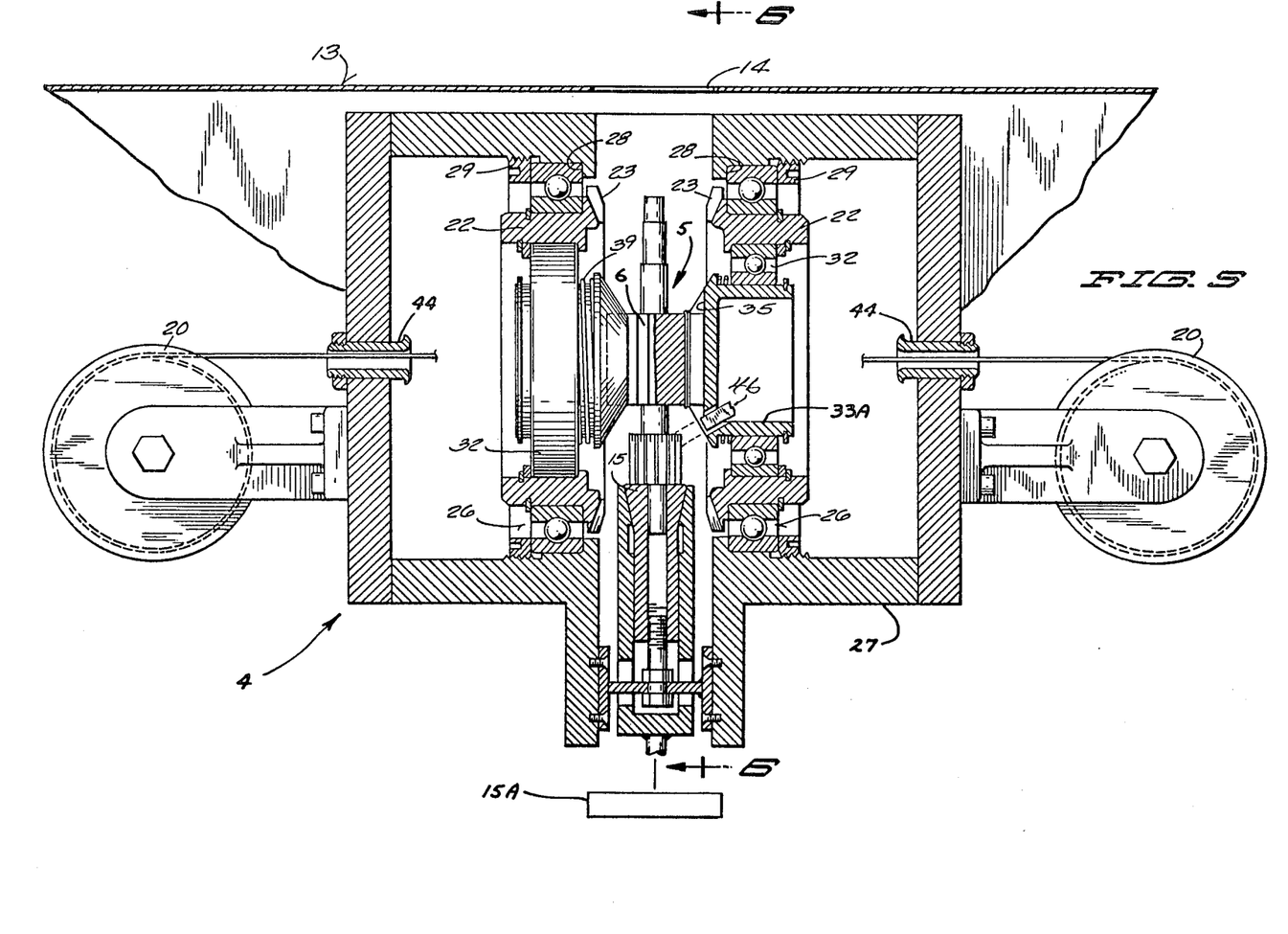
FIG. 5 is a vertical sectional view through FIG. 4 on a plane of the line 5—5.
Figure 6:
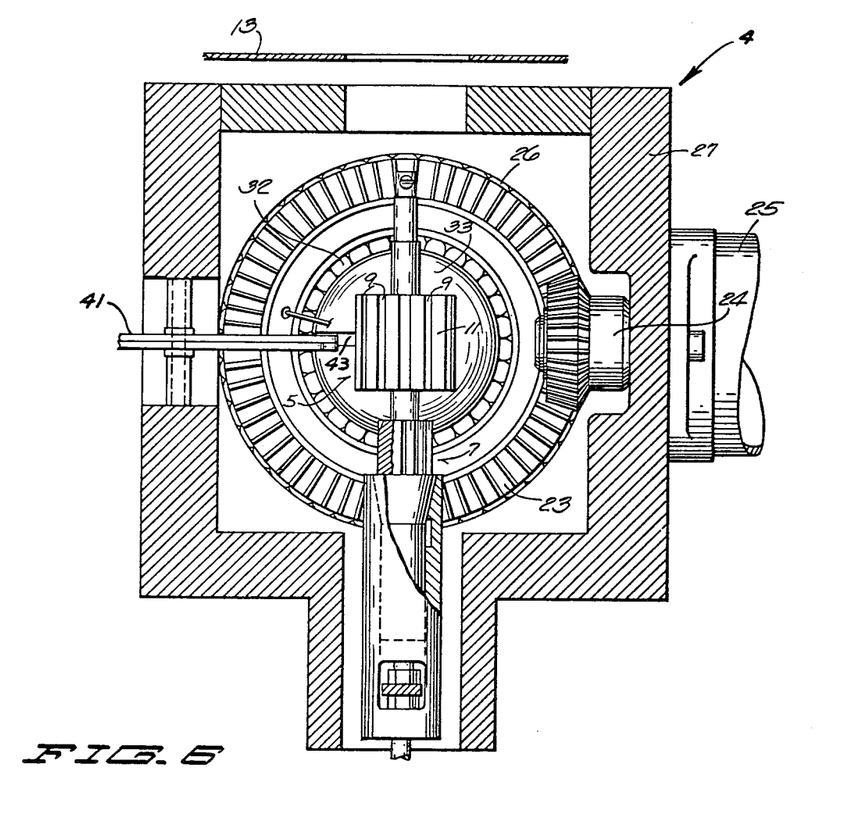
FIG. 6 is a vertical sectional view through FIG. 5 on the plane of line 6—6.

Below the top wall of the cabinet is the coil winding mechanism of the machine. As shown in FIGS. 4, 5 and 6, the armature core assembly 5 is vertically oriented during the coil winding operation, with its commutator end lowermost. As the armature core assembly 5 is lowered into the machine 4, it locates itself vertically by having the commutator seat upon the top of a vertically oriented collet 15. At the same time, the bottom end portion of its shaft 8 is tightly gripped and coaxially connected with the drive shaft of an electric motor 15A, of the type that is capable of imparting minute increments of rotation to its drive shaft as well as larger segments thereof, including a full 360° turn. Moreover, a motor of this type produces the designated increments of rotation very rapidly.

The drive shaft of the motor 15A also has a shaft encoder coupled to it. A shaft encoder is an electromechanical device that can be used to provide an electronic output in the form of a series of identical pulses identifying minute increments of rotation of the shaft to which the encoder is coupled. The Technical Bulletin 5-70-G, published by Encoder Division of Litton Industries in Chatsworth, California, describes such an encoder.

The output of the encoder is fed into the memory bank of a computer that forms part of a control system for the winding machine 4 that is housed in a cabinet 16 and connected with the winding machine 4 by an umbilical cord 17. Also fed into the computer are signals that are derived from sensing the locations of the slots 9 in the core of the armature core assembly 5 and the locations of the slots 12 in the commutator segments 11 upon relative rotation between slot-location-sensing means and the armature core assembly 5. Thus, by effecting such relative rotation by means of the electric motor 15A, the slot location information and the output of the encoder are compared by the computer and the exact center of every slot (both core and commutator)

with respect to a zero position is established in the computer memory. It requires but an infinitesimally short time to feed this information into the computer and for the computer to make the needed comparison, so that in practically no time after the armature core assembly is inserted into the winding machine, its control system is set to automatically index the machine, successively wind the coils onto the core and attach the leads to and from the coils to the commutator segments.

The aforesaid method of comparing the slot location information with the output of a shaft encoder and utilizing the results of that comparison to accurately index the armature core assembly, is the subject matter of U.S. Pat. No. 3,911,563 issued Oct. 14, 1975. Reference is made to that application to show that a control system is available to operate an armature winding machine 4 at the entirely uprecedented speeds which, for the first time, can be achieved by the instant invention. Other types of drives and indexing means for the armature core assembly can be used. The machine sequence can be relay logic controlled. Mechanical devices, as clutches and stops, can be used to index the armature core assembly Fluid motors, as hydraulic motors, can be used to drive and index the annular members during the winding operation.

To gain that high operating speed, the present invention utilizes an entirely new way of winding the wire onto the armature core 6. Thus, as shown particularly in FIGS. 4–6, wire drawn from a pair of spools 20 passes through holes 21 in annular members having sleeves or rims 22 and a pair of bevel ring gears 23, to the core slots 9 in position to have wire wound therein. Since, as is customary, two coils are simultaneously wound, the winding mechanism is duplicated at opposite sides of the location which the armature core assembly 5 occupies during the winding operation. The two bevel gears 23 are driven (in opposite directions) by a bevel drive pinion 24 which meshes therewith and is driven by an electric motor 25.

The bevel gears 23 are journalled in large ball bearings 26 mounted in a cylindrical housing 27. The outer race of each of these bearings is confined between a fixed shoulder 28 and a retaining ring 29 threaded into the housing 27. The inner race of each bearing 26 encircles the rim 22 of its associated bevel gear, where it is confined between a shoulder 30 and a spring retaining ring 31.

A second smaller ball bearing 32 seated in the bore of each bevel gear 23 mounts a shroud 33 that has a smooth generally conical wire guiding surface 34 and a concavely curved core receiving recess 35 in its apex to embrace one side of the core 6 of an armature core assembly 5 in position to be wound. As in prior armature winding machines, the two shrouds or chucks 33 coact to grip the armature core 6 therebetween with their smooth wire guiding surfaces 34 positioned to guide the stretches of wire leading from the mouths of the holes 21 in the rims of the bevel gears 23 into the core slots 9 in position to have wire coils wound therein, by rotation of the bevel gears 23.

Obviously, neither shroud 33 rotates and hence its cylindrical wall 36 that gives the shroud 33 its cup-shaped formation can have a snug fit in the inner race of its associated ball bearing 32. But the cylindrical wall 36 is axially slidable in the inner race of the ball bearing 32. The outer race of the ball bearing 32 has a reasonably tight fit in the bore of the bevel gear 23 and is held against axial displacement with respect to the bevel gear 23 by being confined between a shoulder 37 in the bore of the gear 23 and a retaining ring 38 seated in a groove in the bore of the gear 23.

The ball bearing 32 are thus held against axial displacement with respect to their respective gears 23, but the shrouds 33 have a degree of axial motion sufficient to enable the shrouds 33 to move into and out of engagement with an armature core 6 therebetween. Springs 39 confined between the inner races of the bearings 32 and opposing shoulders on the shrouds yieldingly press the shrouds against the core, and retaining rings 40 fitted in annular grooves in the exterior of the cylindrical walls 36 limit the spring produced axial motion of the shrouds when no armature core is present.

To spread the shrouds 33 apart for the admission of an armature core assembly 5 therebetween, and also allow removal of the wound armature of the shrouds 33 as well as to release the assembly for indexing rotation thereof, a spreading device, here shown for purposes of illustration as a pair of pivotally connected fingers 41 is provided. By automatically operated means (not shown) an actuator 42' is rotated to spread the fingers 41 into engagement with the adjacent surfaces of the shrouds 33 and upon further rotation of the actuator 42' to spread the shrouds 33 farther apart.

When an armature core 6 is gripped between the shrouds 33, that engagement holds the shrouds 33 against rotation about the axis of the ring gears, but the shrouds 33 must also be held against rotation when no armature core is present. This can be done by having the fingers 41 ride in grooves 43 in the surface 34 of the shrouds 33, since at times when the shrouds 33 are being spread apart, there is no rotation of the gears 23 and hence no possibility of the stretches of wire that lead to the core slots 9 coming into contact with the shroud-spreading fingers 41.

The manner in which the wire is guided in its movement from the spools 20 to the holes 21 in the rims of the gears 23, obviously is a matter of choice. One of the ways of doing this is to thread the wire through tubes 44 mounted by supporting structure 45 in fixed relation coaxially with the gears 23 and between them and the spools 20. The supporting structure 45 can also support the spools 20.

An especially advantageous feature of this invention is the fact that the cup-shaped hub portion 33A of the shrouds 33 provides space close to the zone of action, in which to locate wire directing and manipulating tooling by which any of a number of operations can be performed while the winding operation is in progress. Thus, as an illustration of what the availability of this space can mean, note in FIG. 5 the diagrammatic illustration of wire holding and stuffing instrumentalities 46 by which the looped leads from and to successive coils wound onto the core can be mechanically and electrically connected to commutator segments. The instrumentalities 46 would of course be mounted in the cup-shaped web portions 33A of the shrouds 33 along with their actuators.

The concept underlying this invention might be expressed as an island surrounded by a sea of rotary motion, wherein the cup-shaped shroud 33 and the wire manipulating instrumentalities housed therein constitute the island and the rotating gear 23 and the wire issuing from the mouth of the hole 21 through its rim 22 and sliding smoothly over the surface 34 of the shroud 33 form the rotating sea of motion. This concept obviously can be implemented in structural embodiments different from that shown in FIGS. 4-6.

Figure 7:
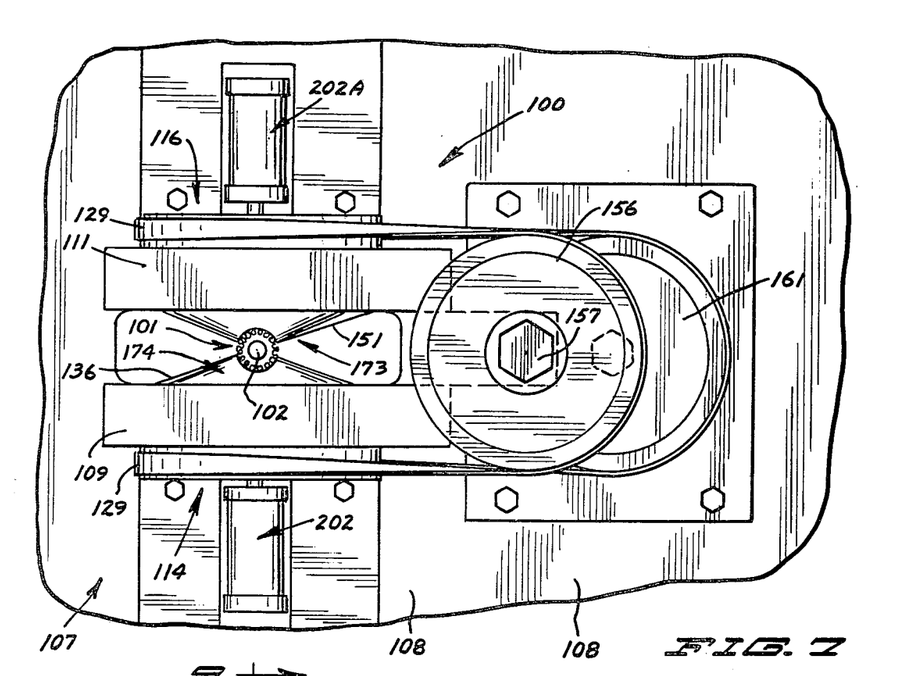
FIG. 7 is a top plan view of a second embodiment of the invention.
Figure 8:
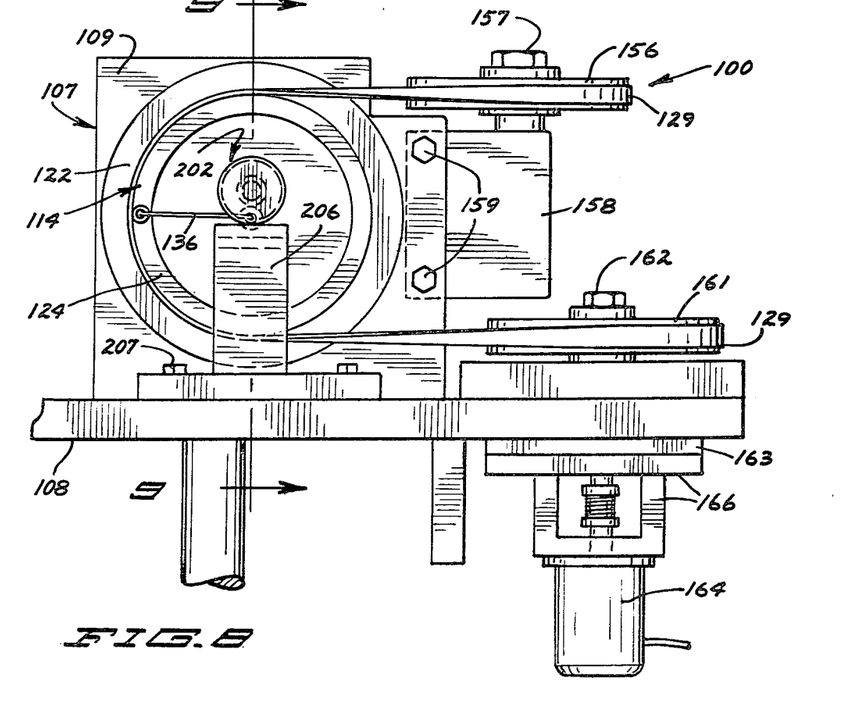
FIG. 8 is a side elevational view of FIG. 7.
Figure 9:
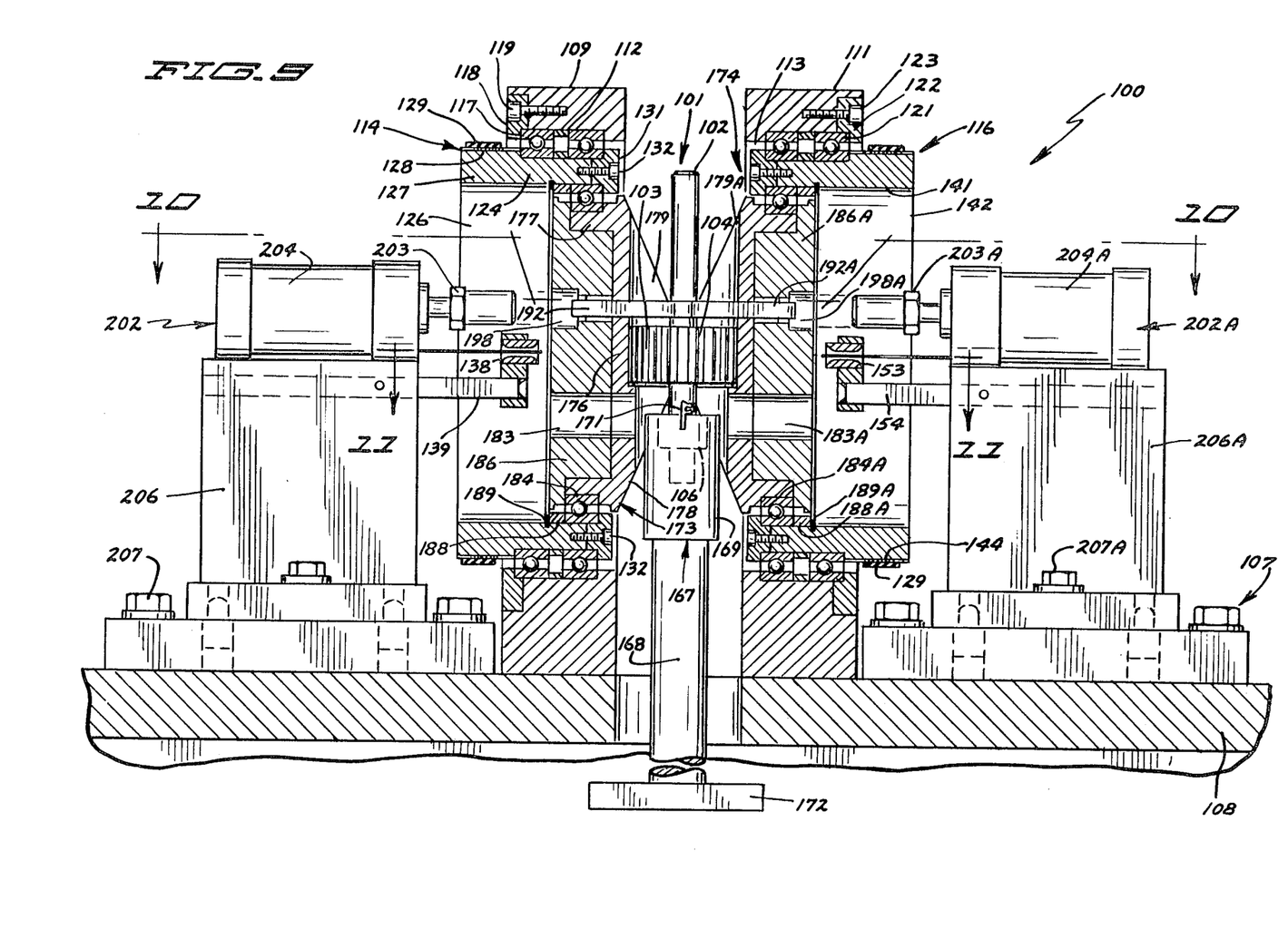
FIG. 9 is an enlarged sectional view taken along line 9—9 of FIG. 8.

Referring to FIGS. 7, 8 and 9, there is shown a second modification of the wire winding machine of the invention indicated generally at 100 for winding coils of wire on a core of an armature. Machine 100 is operative to wind coils of wire on an armature core assembly 101 having an upright shaft 102. A core 103 is mounted on the midportion of shaft 102. Core 103 has a plurality of outwardly open longitudinal slots 104 spaced around the outer portions of the core. The slot arrangement of the core 103 is particularly shown in FIG. 11. A commutator 106 is mounted on the lower end of shaft 102. The armature core assembly 101 has the same construction as armature core assembly 5 shown in FIG. 1.

Figure 3:
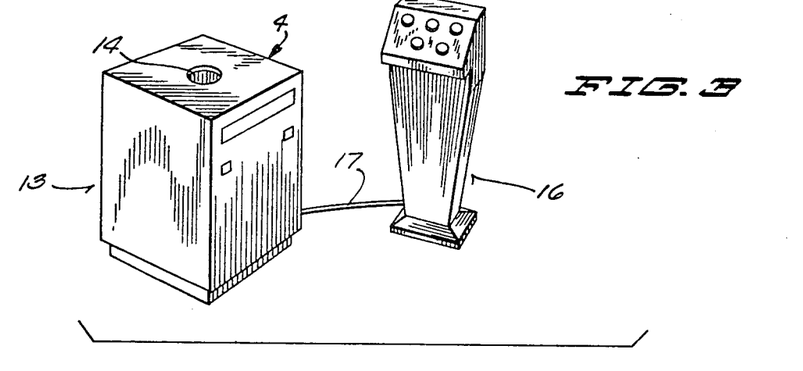
FIG. 3 is a perspective view of the exterior of the armature winding machine of this invention and its control console.

The wire winding machine or apparatus 100 has a stationary frame or support structure indicated generally at 107. Frame 107 can be enclosed in a cabinet-like structure, as shown in FIG. 3. The frame 107 includes a generally horizontal table 108. A first upright support or housing 109 is secured to the table 108 on one side of the armature core assembly 101. A second upright support or housing 111 is located on the opposite side of armature core assembly 101. Frames 109 and 111 are flat plate-like stationary members located in spaded side-by-side parallel relation to each other. The lateral space between the frames 109 and 111 is sufficient to permit the armature core assembly 101 to be positioned between the frames 109 and 111. Housing 109 has a side opening 112 to expose the core 103. Housing 111 has a similar opening 113.

A first annular member or ring indicated generally at 114 is located in opening 112. A second annular member or ring 116 is located in opening 113. Annular members 114 and 116 each have a diameter larger than the length of core 103 so that the wires are located adjacent the ends of the core. A pair of ball bearings 117 rotatably mount the member 114 on the housing 109. A retainer plate 118 is secured to housing 109 with bolts 119 to hold bearings 117 and member 114 in operative relation with housing 109. The member 114 is free to rotate on bearing 117 about a horizontal axis generally perpendicular or normal to the upright axis of shaft 102.

Figure 10:
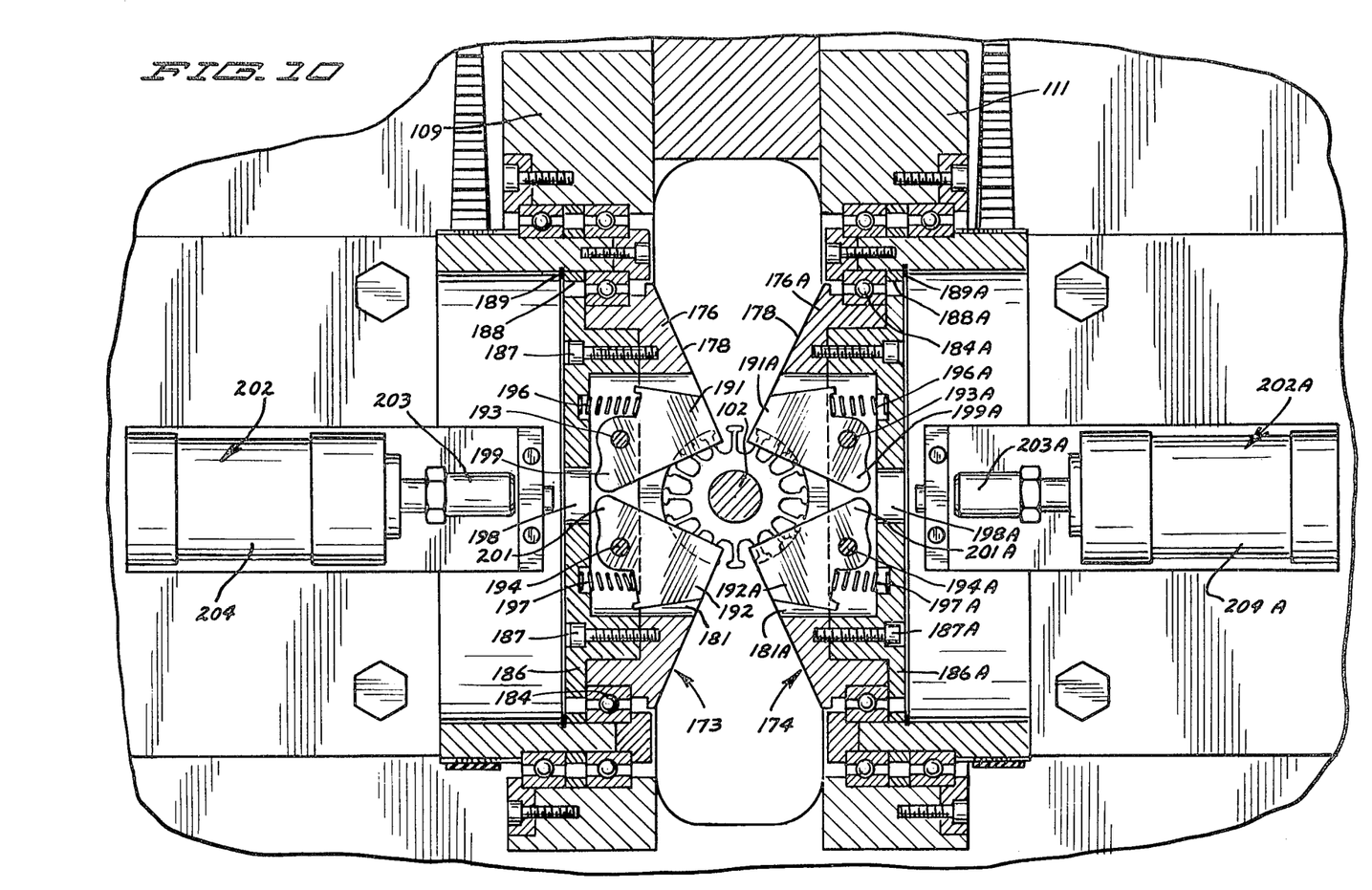
FIG. 10 is a sectional view taken along line 10—10 of FIG. 9.

The second annular member 116 is rotatably mounted on a pair of bearings 121. Bearings 121 are held on housing 111 with a retainer plate 122. Bearings 117 and 121 can be single bearing structures of air bearings. A plurality of bolts 123 secure retainer plate 122 to the housing 111. The annular member 116 is free to rotate about a horizontal axis that coincides with the axis of rotation of the annular member 114. This axis is a horizontal axis, as shown in FIG. 10, and is generally perpendicular or normal to the upright axis of the shaft 102.

The annular member 114 has a cylindrical shape and comprises a sleeve or rim 124 mounted on bearings 117. The sleeve 124 surrounds an opening 126. The outer end of sleeve 124 has a driven or annular pulley portion 127. A plurality of outwardly directed teeth 128 surround the pulley portion 127. Teeth 128 cooperate with teeth on an endless drive belt 129 to rotate the annular member 114. A flat retainer ring 131 is secured to the inside of sleeve 124 with a plurality of bolts 132 to hold the sleeve in operative relation with the bearings 117.

Figure 12:
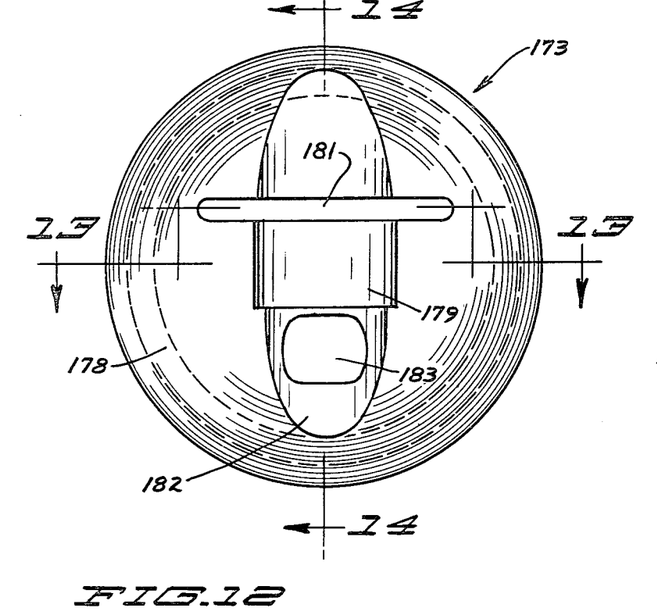
FIG. 12 is a front elevational view of a wire guiding shroud used in the apparatus of FIG. 7.

As shown in FIG. 12, sleeve 124 has a longitudinal passage or hole 133. A cylindrical tubular needle 134 is located in the inner portion of the passage 133 and fixed to the sleeve 124. Wire 136 is threaded through needle 134 and extends through a hole 137 to a tubular guide 138. Tubular guide 138 is mounted on support structure 139 and is located along the axis of rotation of the annular member 114. The wire 136 moves from a storage supply, such as a reel, through tubular guide 138 and needle 134 as it is wound on core 103.

Figure 11:
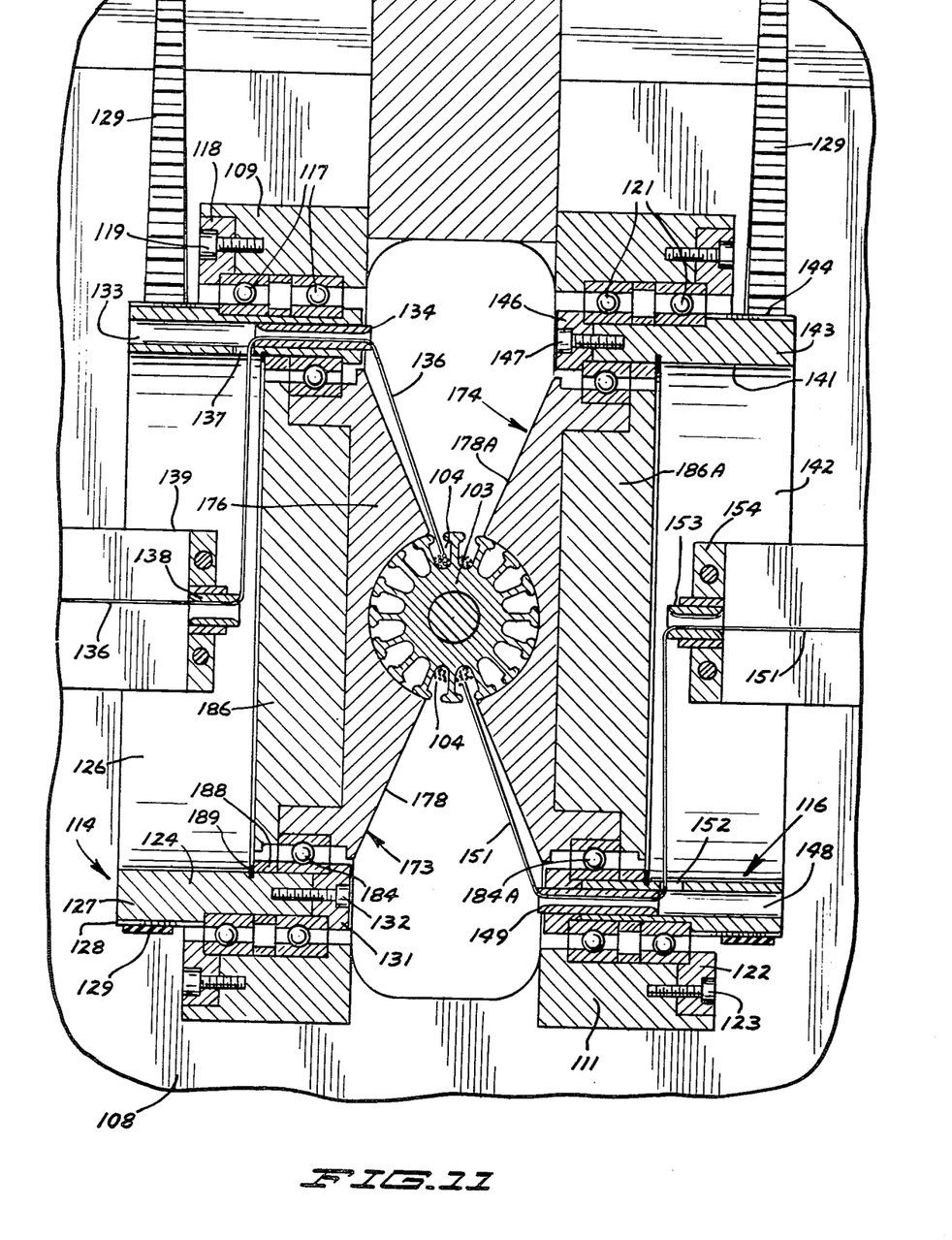
FIG. 11 is a sectional view taken along line 11—11 of FIG. 9.

The second annular member 116 is identical in construction with the first annular member 114. Member 116 is of a cylindrical shape having a sleeve or rim 141. Sleeve 141 surrounds an opening providing access to the armature core 103. The outer part of sleeve 141 includes a drive or pulley portion 143 having a plurality of external teeth 144. The belt 129 is trained about pulley portion 143 and on operation of the machine will rotate the annular member 116. A flat retainer ring 146 is attached to the inner end of sleeve 141 with a plurality of bolts 147. Plate 146 cooperates with bearings 121 to hold the sleeve 141 in rotating relationship with the housing 111. As shown in FIG. 11, sleeve 141 has a longitudinal hole 148 located approximately 180° from hole 133 in sleeve 124. A cylindrical needle 149 is disposed in the inner end of hole 148 and accommodates a wire 151. The wire 151 extends from the core 103 through cylindrical needle 149 and a hole 152 into the opening 142. A tubular guide 153 is mounted on a support 154 and accommodates the wire 151 as it moves from the wire supply, as spool 20 in FIG. 5. Tubular guide 153 is located in axial alignment with the rotating axis of sleeve 141 which is also aligned with the axis of rotation of sleeve 124.

Returning to FIGS. 7 and 8, the annular members 114 and 116 are rotated in opposite directions about a common transverse generally horizontal axis. The axis of rotation is normal, or 90°, relative to the axis of shaft 102 of the armature core assembly 101. The drive means for annular members 114 and 116 includes an idler pulley 156 rotatably mounted on an upright axle 157. A support 158 holds the axle 157 in an upright position. A plurality of nut and bolt assemblies 159 attach the support to housing 109. Located below idler pulley 156 is a drive pulley 161. Drive pulley 161 is secured to an upright drive shaft 162. Drive shaft 162 is connected to an electric motor 163. An encoder 164 is connected to motor 163. Encoder 164 is electrically coupled to a control mechanism, such as a computer with its associated memory. Support structure 166 mounts encoder 164 to the motor 163.

Belt 129 is trained about the drive pulley 161, about pulley portions 127 and 143 of the annular members 114 and 116, respectively, and around idler pulley 156. On operation of motor 163, the annular members 114 and 116 will be driven in opposite rotational directions through the means of common belt 129 trained about the respective pulleys. Each pulley 127, 143, 156 and 161 is provided with teeth which cooperate with teeth on belt 129. This belt 129 and pulleys 127, 143, 156 and 161 insure that the timing of the rotation of the annular members 114 and 116 does not change.

Referring to FIG. 9, the armature core assembly 101 is located in an upright position between the annular members 114 and 116. The lower end of shaft 102 is located within a releasable holder indicated generally at 167. Holder 167 includes a releasable collet or chock, as shown in FIG. 5. Holder 167 includes a cup member 169 having a pair of upwardly directed cutters or fingers 171. Cup member 169 is part of a commutator shielding and lead moving and guiding unit which is operative to move and guide each ending wire lead which extends from the coil just wound about the shaft 102 and around a selected commutator hook. The entire commutator, except a selected hook, is shielded to prevent other or previously attached leads from leaving their hooks. An example of this structure is shown in U.S. Pat. No. 3,636,621. The coil leads can be attached to the commutator with the apparatus and method disclosed in U.S. Pat. No. 3,911,563.

A motor 172 is drivably connected to shaft 102 through drive structure (not shown) located within tube 168 operable to impart minute increments of rotation and thereby index core 103 during the winding procedure. The drive shaft of the motor has a shaft encoder coupled to it. The shaft encoder (not shown) is an electromechanical device that is used to provide an electronic output in the form of a series of identical electrical pulses identifying minute increments of rotation of the shaft to which the encoder is coupled. The output of the encoder is fed into the memory bank of a computer that forms part of the control system of the winding machine.

Referring to FIGS. 10 and 11, a first wire guiding means, chuck or shroud, indicated generally at 173, is located adjacent one side of the core 103 and mounted on the first annular member 114. A second wire guiding means, chuck or shroud, indicated generally at 174, is located adjacent the opposite side of core 103 and is mounted on the second annular member 116. The first shroud 173 functions to guide the wire 136 into opposing pairs of slots during the winding procedure. The second shroud 174 functions to guide wire 151 into a second pair of slots during the winding procedure.

The shrouds 173 and 174 are identical in construction and are located in face-to-face position, as shown in FIGS. 10 and 12, adjacent opposite sides of core 103. The following description is limited to shroud 173. The identical parts of shroud 174 have the same reference numerals with the suffix A.

Figure 13:
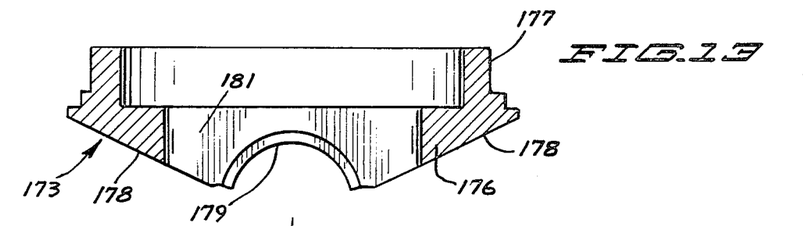
FIG. 13 is a sectional view taken along line 13—13 of FIG. 12.
Figure 14:
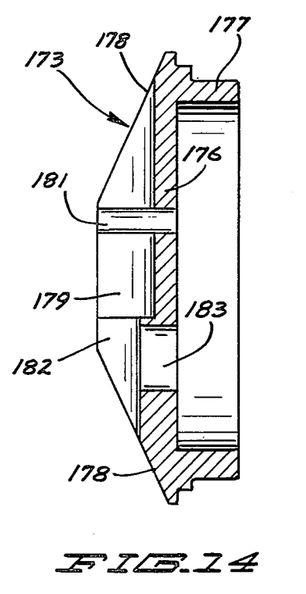
FIG. 14 is a sectional view taken along line 14—14 of FIG. 12.

Referring to FIGS. 12–14, shroud 173 has a cup-shaped body 176 including an annluar flange 177. The front face of body 176 has an outwardly shaped cone surface 178 which functions as a guiding surface for the wire during the winding procedure. A first upright semi-circular recess or pocket 179 is located in the midportion of body 176 to accommodate an arcuate segment of the core 103. Pocket 179 has a circumferential curvature that conforms to the outside diameter of core 103 so that core 103 has a loos contact fit with the shroud. Shrouds 173 and 174 do not spread or open during loading and unloading of the machine. This permits a faster winding cycle as shroud movements have been eliminated. Pocket 179 is bisected with a horizontal slot 181 which extends through body 176. A second recess or pocket 182 is located below pocket 179. Pocket 182 has a semi-circular shape and is smaller in size than pocket 179. A hole 183 is open to pocket 182 to provide access to the commutator region of the armature core assembly.

Referring to FIGS. 9, 10 and 11, the flange 177 is mounted on an annular ball bearing 184. Bearing 184 is mounted on the inside of the sleeve 124 and retained thereon with a ring 188 and a snap member 189. A circular plate 186 is secured to the inside of the body 176 with a plurality of bolts 187. As shown in FIGS. 10 and 11, the core 103 fits into pockets 179 and 179A and prevents shrouds 173 and 174 from rotating with the first annular member 114 and the second annular member 116. The wire is guided past the end of core 103 and into the slots 104 with a pair of pivotally mounted tabs 191 and 192. Tabs 191 and 192 are movably located in slots 181 and are pivotally mounted on member 186 with a pair of pins 193 and 194, respectively. A first spring 196 is engageable with plate 186 and tab 191 to bias tab 191 toward shaft 102. A second spring 197 engages plate 186 and tab 192 to bias tab 192 toward the shaft 102. The tabs 191 and 192 are biased toward one another by the springs 196 and 197, respectively. The center of plate 186 has a hole 198 in alignment with lobe or end portions 199 and 201 of the tabs 191 and 192, respectively. The tabs 191 and 192 are moved to their release positions with an actuator indicated generally at 202. Actuator 202 has a plunger 203 in axial alignment with hole 198. The plunger 203 is movably mounted on a motor 204, such as fluid motor or electric solenoid. As shown in FIG. 9, actuator 202 is mounted on a stand or support 206. A plurality of bolts 207 secure the support to the table 108.

The shroud 174 has a pair of movable tabs 191A and 192A. The tab mounting and actuator structure is the same as the tab mounting and actuating structure hereinbefore described. The identical parts have the same reference numerals with the suffix A.

On operation of the actuators 202 and 202A, the plungers 203 and 203A move through holes 198 and 198A and engage tab portions 198, 199 and 198A, 199A to move tabs 191, 192, 191A and 192A to the open positions whereby the core 103 can be removed from between the shrouds 173 and 174 after the winding procecure is completed. A new unwound armature core assembly can then be placed between the shrouds 173 and 174 and held by the releasable holder 167.

In use, an armature core assembly 101 is initially placed between the shrouds 173 and 174 with the core 103 in the first pockets 179 and 179A. The tabs 191, 192 and 191A, 192A are held in their open position on actuation of the actuators 202 and 202A. The plungers 203 and 203A of the actuators move through holes 198 and 198A and move and hold tabs 191, 192, 191A and 192A in their open positions, thereby permitting core 103 to be placed in the bottom of the first pockets 179 and 179A. The commutator 106 is enclosed by cup member 169. The lower end of the commutator shaft 102 is held in the collet or chuck that is drivably connected to motor 172.

The actuators 202 and 202A are then released by moving the plungers 203 and 203A out of the holes 198 and 198A. The springs 196, 197, 196A and 197A bias their respective jaws 191, 192, 191A and 192A to their forward positions, as shown in full lines in FIG. 11.

Initially, the wires 136 and 151 are attached to separate commutator segments and extend through opposite slots 104 in the core 103. Wire 136 is threaded through the cyclindrical needle 134 and tubular guide 138. The wire 151 is threaded through tubular needle 149 and tubular guide 153, as shown in FIG. 12. The wires 136 and 151 lead to separate wire supplies, such as wire storing spools. Suitable wire tensioning structures (not shown) can be associated with the wires 136 and 151 to keep the proper tension on the wires during the winding procedure.

The wires 136 and 151 are wound in separate pairs of slots 104 during the winding procedure on energization of motor 163. The motor 163 drives the drive pulley 161 to move the belt 129. Belt 129 rotates the annular members 114 and 116 in opposite directions and carries wires 136 and 151 around the core, thereby placing coils of wire in the two pairs of slots 104. The wire 136 is guided by the cone surface 178 of the shroud 173 into the first pair of slots. Tabs 191 and 192 direct the wire over the end of the core. In a similar manner, the cone surface 178A of shroud 174 guides the wire 151 into a second pair of slots in the core 103.

During the winding procedure, holes 183 and 183A provide access to the commutator 106. The holes provide access for wire holding and stuffing instrumentalities (not shown), such as instrumentality 46, by which the loop leads of the wire from and to successive coils can be mechanically and electrically connected to the commutator segments. The intrumentalities can be mounted in plates 186 and 186A or directly on the table 108 with suitable support structure. When a pair of coils have been wound, motor 163 is stopped. The indexing motor 172 is operated to index core 103 to a second position, to thereby expose unwound pairs of slots 106. The motor 163 is the energised to wind additional coils of wire onto the core 103. This procedure is followed until all of the coils have been wound on the core. The core is then removed from between shrouds 173 and 174 after tabs 191, 192 and 191A 192A have been released. The collet or holding structure for the bottom of the shaft is also released whereby the wound armature core assembly is removed through the top opening of the machine and an unwound core is placed in the machine.

Figure 15:
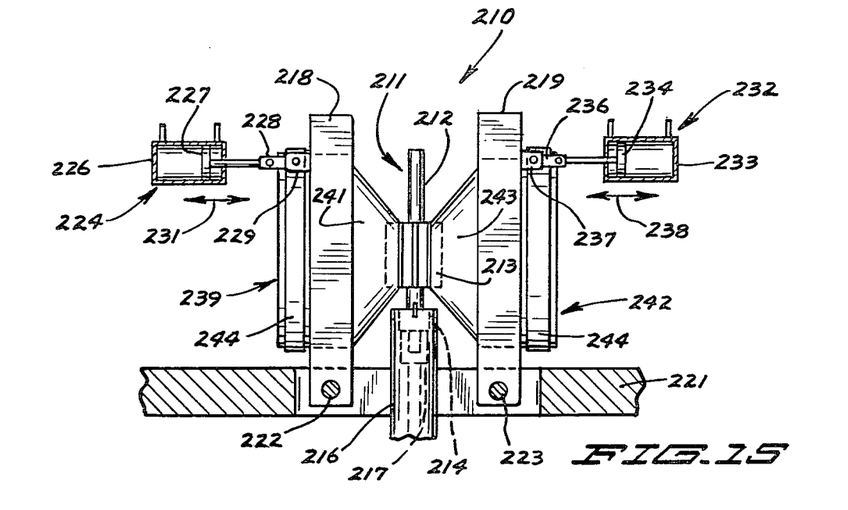
FIG. 15 is a front elevational view of a third embodiment of the invention.

Referring to FIG. 15, there is shown a front elevational view of a fourth embodiment of the wire winding machine of the invention indicated generally at 210. Machine 210 is operable to hold an armature core assembly 211 in a vertical position during the winding operation. The armature core assembly 211 has an upright shaft 212 carrying a slotted core 213. A commutator is secured to the shaft below core 213.

Machine 210 has a releasable holder 216 containing a holding collet 217 for holding the bottom of shaft 212 to thereby support the armature core assembly 211 in an upright position. A first housing 218 is located adjacent one side of the core assembly 211 and a second housing 219 is located adjacent the opposing side of the armature core assembly. The housings are upright members and are pivotally connected to a support or table 221. Transverse pivot 222 connects the lower end of housing 218 to table 221. In a similar manner, a transverse horizontal pivot 223 connects the lower end of housing 219 to the table 221. The housings 218 and 219 can pivot toward and away from the armature core assembly 211. A first actuator indicated generally at 224 is connected to the housing 218 to control the position of the housing. Actuator 224 has a cylinder 226 carrying movable piston 227. Piston 227 is pivotally connected to a link 228. Link 228 is pivotally connected to a tab or bracket 229 secured to the top portion of housing 218. Cylinder 216 is a double acting air cylinder which on actuation will pivot the housing in selected opposite directions, as indicated by arrow 231, about the pivot axis of pivot 222.

A second actuator indicated generally at 232 is operable to control the position of the housing 219. Actuator 232 has a cylinder 233 carrying a movable piston 234. The piston is pivotally connected to a link 236. The opposite end of link 236 is connected to a tab or bracket 237 secured to the upper part of housing 219. The cylinder 233 is a double acting air cylinder operable to selectively move the housing 219 in opposite direction, as indicated by arrow 238.

A first annular rotatable member 239 is mounted on the housing 218. The annular member 239 carries a chuck or shroud 241 operable to engage an arcuate segment of the core 213. The housing 219 has a second annular member 242 having a chuck 243. Chuck 243 engages an opposite arcuate segment of core 213. Chucks 241 and 243 have wire guiding surfaces that function to guide the wires emanating from annular members 239 and 242 into selected pairs of slots in the core 213. The annular members 239 and 242 are identical to the annular members 114 and 116 shown in FIG. 11. The chucks 241 and 243 are the same as chucks 173 and 174 shown in FIGS. 8–15. A common belt 244 drivably connects a common motor to the annular members 239 and 242. The drive structure is the same as the motor and belt drive arrangement as shown in FIGS. 7 and 8.

In use, the actuators 224 and 232 operate to selectively move the housing 218 and 219 toward and away from the armature core assembly 211. Actuators 224 and 232 are operable to provide a clamping action on the core 213 to hold the core in an upright position. When large cores are to be wound, it may be advantageous to support the core with chucks 241 and 243. The actuators 224 and 232 can be actuated to move the chucks 241 and 243 away from the core so that the armature core assembly 211 can be readily removed from the machine.

Figure 16:
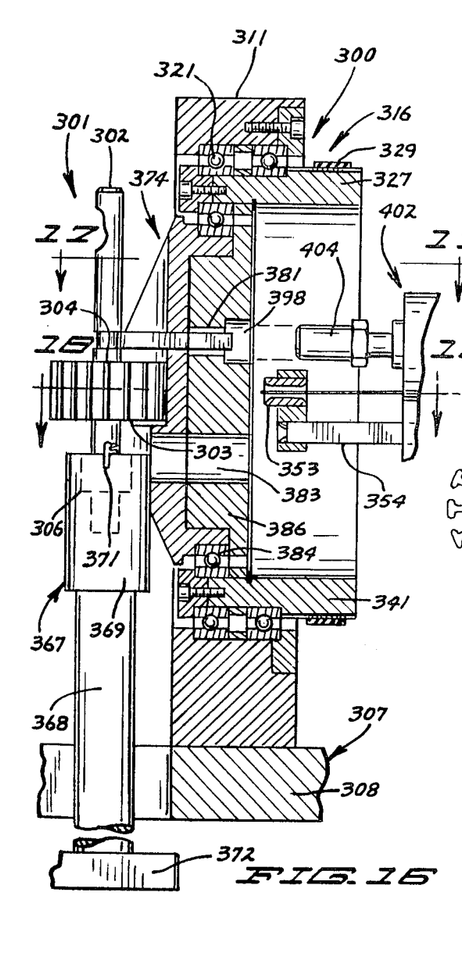
FIG. 16 is a front elevational view, partly sectioned, of a fourth embodiment of the invention.
Figures 17, 18:
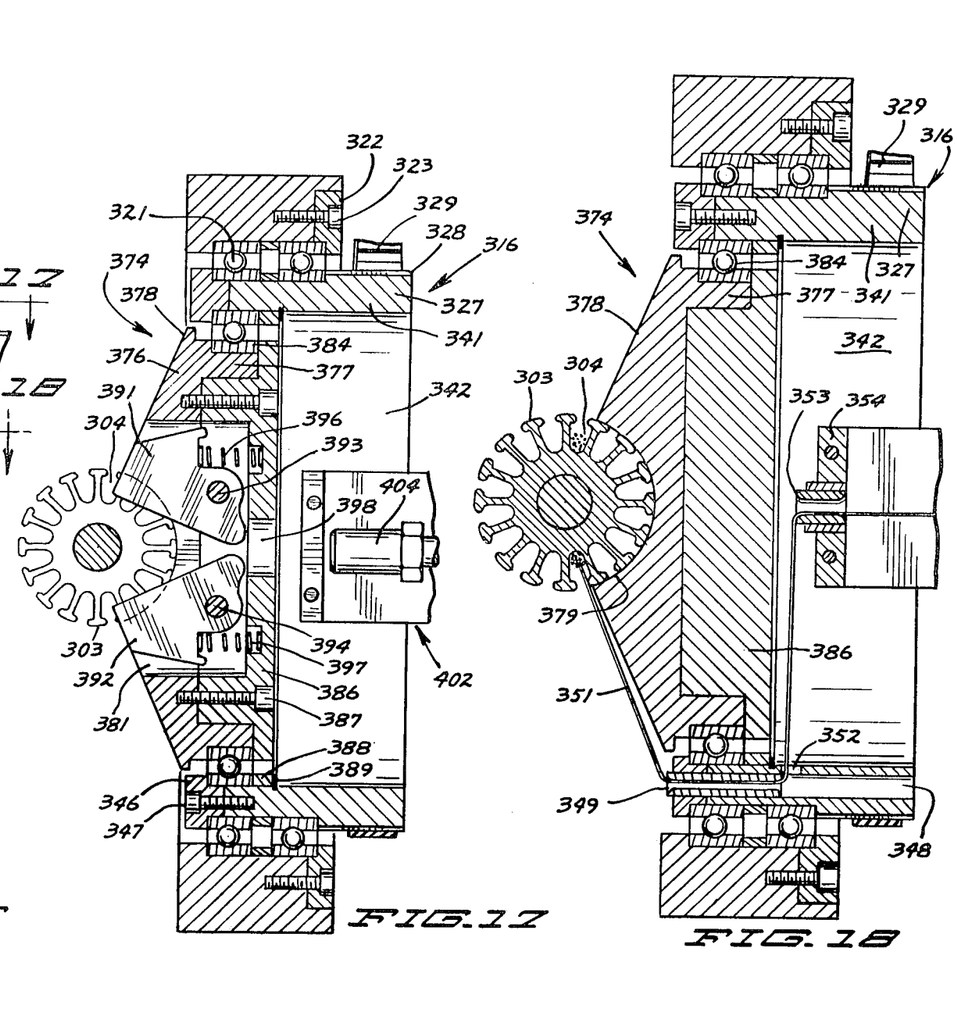
FIG. 17 is a sectional view taken along line 17—17 of FIG. 16.
FIG. 18 is a sectional view taken along line 18—18 of FIG. 16.

Referring to FIGS. 16–18, there is shown a fourth embodiment of the wire winding apparatus of the invention indicated generally at 300. Machine 300 is operable to wind a single coil of wire into pairs of slots in an armature core 303 of an armature core assembly 301. The armature core assembly 301 is indentical in construction to the armature core assembly 5 and has a shaft 302 carryin core 303. Core 303 has a plurality of outwardly open slots 304 to accommodate the wire. Commutator 306 is secured to the lower end of the shaft 302. The machine 300 is identical to one-half of the machine shown in FIGS. 8–15. The following description identifies the parts of machine 300 that coincide with parts of machine 100 with the same reference numerals having the prefix 3.

The machine 300 has a stationary frame housing 307. Housing 307 includes a horizontal table 308. An upright support or housing 311 is secured to the top of table 308. Housing 311 has an opening 313 for accommodating a rotatable annular member or ring indicated generally at 316. A pair of bearings 321 located between housing 311 and annular member 316 rotatably mount the annular member 316 on the housing. The bearings 321 can be single roller bearings or air bearings. The plate 322 secured to housing 311 with a plurality of bolts 323 holds the bearings in assembled relation with housing 311. The annular member has an annular drive or pulley portion 327 having a plurality of outwardly directed teeth 328. A drive belt 329 is trained about the pulley portion 327 and a drive motor (not shown) operable to rotate the annular member. The annular member 316 has a tubular sleeve or rim 341 surrounding an opening 342. The opening 342 is in alignment with or adjacent the core 303 to provide access to the core and commutator during the winding operation. An inside plate 346 secured to the sleeve 341 with bolts 347 holds the sleeve in assembled relation with bearings 321.

Sleeve 341 and plate 346 have a longitudinal hole 348 accommodating a cylindrical needle 349. The wire 351 is threaded through needle 349 and an inwardly directed hole 352 in sleeve 341. The wire extends through a centrally located tubular guide 352 and to a supply source such as a reel of wire. Tubular guide 353 is carried on a support 354 secured to table 308.

Returning to FIG. 16, the commutator core assembly 301 is held in an upright position with a releasable holder indicated generally at 367. The holder is supported on top of an upright tube 368 and includes a cup member 369 which surrounds the lower end of the shaft and commutator 306. Cup member 369 is retracted so as to expose a tang on the commutator 306 so that lead wires from between the coils may be hooked on the tang. A cutter 371 is used to cut the wire during the winding operation. The shaft 302 is drivably connected to a motor 372. Motor 372 is operable to selectively index the commutator during the winding operation whereby coils of wire are wound in selected pairs of slots. Motor 372 is coupled to an encoder (not shown) and functions in a manner described relative to the motor 172.

A chuck or shroud indicated generally at 374 is mounted on the annular member 316. Shroud 374 has a cone-shaped body 376 and an outwardly directed annular flange 377. The body 376 has a outside cone surface 378 which functions to guide the wire into selective pairs of slots 304 in the core 303. As shown in FIG. 18, shroud 374 has an upright pocket 379 for receiving an arcuate segment of the core 303. Pocket 379 has a circumferential curvature or radius of curvature that is substantially the same as the radius of curvature of the corre 303 and conforms to the arcuate configuration of the pocket 379.

Shroud 374 has slot 381 and a hole 383. The hole 383 provides an access passage to the commutator area of the armature core assembly 301. Wire working tools or instrumentalities can be moved through hole 383 to manipulate the wire during the winding procedure and perform other wire handling functions. An annular bearing 384 is located between the flange 377 and the sleeve 341 whereby the annular member 316 rotates relative to the shroud 374. The shroud 374, being in engagement with an arcuate segment of the core 303, does not rotate with the annular member 316. A plate 386 is attached to the inside of the shroud body 376 with a plurality of bolts 378. An annular ring 388 bears against bearing 384 and is retained on sleeve 341 with expanding ring 389.

A pair of arcuately movable tabs 391 and 392 are located in the slot 381. A pivot pin 393 pivotally connects tab 391 to plate 386. In a similar manner, pivot pin 394 connects tab 392 to plate 386. Tab 391 is biased in an outward direction or toward the core 303 with a spring 396. Spring 396 is positioned between plate 386 and an outer portion of tab 391. Tab 392 is biased toward the core 303 with a spring 397. Spring 397 is located between an outer portion of tab 392 and plate 386. Adjacent inner portions of tabs 391 and 392 are located in alignment with a central hole 398 in the plate 386. The center hole 398 is in axial alignment with an actuator indicated generally at 402. Actuator 402 has a cylinder 403 carrying a movable plunger 404. Plunger 404 is in alignment with hole 398 and is movable into the hole to engage the adjacent portions of tabs 391 and 392 to move the tabs to a release position whereby the armature core assembly 301 can be removed from the machine. The cylinder can be a double acting air cylinder and identical in construction and operation to the cylinder 204 shown in FIG. 9.

In use, the armature core assembly 301 is loaded into the machine in an upright position, as shown in FIG. 16. The actuator 402 is actuated whereby the plunger 404 moves the tab 391 and 392 to their release positions. The collet or chuck structure in the holder 367 holds the armature assembly 301 in an upright position. A portion of the core 303 is located in pocket 379, as shown in FIG. 19. The actuator 402 is released whereby the tabs 391 and 392 are biased to their operating position, as shown in FIG. 18. The tabs 391 and 392 function to guide the wire over the end of the core so that the wire does not hook or catch on the end of the core. The wire 351 is wound in a pair of slots 304 by rotating the annular member 316. The belt 329 transmits the power from the motor to the annular member. The belt 329 can be replaced with suitable spur gear or bevel gear structure operable to transmit power and rotate the annular member 316. During the winding procedure, the motor 372 is operable to selectively index the core so that wire is wound in all of the slots 304. During the winding procedure, wire handling tools such as com-stuffing tools shown in FIG. 5 and other wire handling tools can be used to handle the wire without removing the armature core assembly from the machine. When the winding operation is completed, actuator 402 is operated to move tabs 391 and 392 to the release position. The collet or chuck holding mechanism holding the bottom of the shaft 302 is released. The wound armature core assembly can then be removed from the machine.

While there have been shown and described preferred embodiments and methods of winding armature cores, it is understood that changes, alterations and modifications can be made by those skilled in the art without departing from the invention.

The embodiments of the invention in which an exclusive property, or privilege is claimed are defined as follows:

1. An apparatus for winding coils of wire on an object having a longitudinal axis comprising:
    means for supporting the object in a wire receiving position,
    winding assemblies located adjacent opposite sides of the means to support the object,
    each said assembly including:
    a. like first and second respective rotatable winding means for winding wire on said object,
    b. said first and second rotatable winding means each respectively comprising an annular member having an outer peripheral surface and a central opening,
    c. means radially aligned with said outer peripheral surface rotatably mounting said annular member on the winding assembly means for rotation about an axis normal to the longitudinal axis of the object,
    d. shield means for guiding wire to the object, said shield means having a portion located in said central opening,
    e. means radially aligned with said mounting means on the annular member outer peripheral surface rotatably connecting the shield means to the annular member and locating the annular member around at least part of the shield means,
    f. said annular member having passage means disposed radially outwardly of said opening for accommodating wire whereby on rotation of the annular member wire is directed around the shield means and directed thereby to the object,
    g. said annular member, shield means, mounting means, and connecting means of said winding assembly thereby being in radial alignment proximate the object and defining a radial zone of limited axial extent and having a diameter substantially greater than the axial extent thereof, drive means for rotating said first and second winding means in opposite directions, said drive means including a motor and a single belt having parallel arcuate reaches drivably connecting the motor with and along the annular members of the first and second winding means, and pulley means connecting said reaches for movement in opposite directions whereby the annular members are driven in opposite rotational directions to wind coils of wire on the object.

2. The apparatus of claim 1 wherein said pulley means includes pulleys having teeth, and said belt has teeth cooperating with the said pulley teeth to maintain the relative timing between said pulleys in driving said annular members in opposite directions.

* * * * *

UNITED STATES PATENT AND TRADEMARK OFFICE
CERTIFICATE OF CORRECTION

PATENT NO. :   4,262,853
DATED      :   April 21, 1981
INVENTOR(S) :  Raymon H. Dammar It is certified that error appears in the above-identified patent and that said Letters Patent are hereby corrected as shown below:

Column 6, line 59, "web" should be -- hub --.

Column 7, line 47, "of" should be -- or --.

Column 11, line 12, "intrumentalities" should be -- instrumentalities --.

Column 11, line 40, "opposing" should be -- opposite --.

Column 12, line 34, "carryin" should be -- carrying --.

Column 12, line 42, after "frame" insert -- or --.

Column 12, line 50, "The" should be -- A --.

Signed and Sealed this

Twenty-fifth Day of August 1981

[SEAL]

Attest:

Attesting Officer

GERALD J. MOSSINGHOFF

Commissioner of Patents and Trademarks